March 8, 1966 A. F. PODELL 3,239,781

HYBRID NETWORK EMPLOYING HIGH PERMEABILITY FERRITE TUBES FOR ISOLATION OF SELECTED TRANSMISSION LINES

Filed Dec. 20, 1962

INVENTOR.
ALLEN F. PODELL
BY
James and Franklin
ATTORNEYS

United States Patent Office 3,239,781
Patented Mar. 8, 1966

3,239,781

HYBRID NETWORK EMPLOYING HIGH PERMEABILITY FERRITE TUBES FOR ISOLATION OF SELECTED TRANSMISSION LINES

Allen F. Podell, Wilton, Conn., assignor to Anzac Electronics, Inc., Cannondale, Conn., a corporation of Connecticut Filed Dec. 20, 1962, Ser. No. 246,121
20 Claims. (Cl. 333—11)

The present invention relates to a hybrid connector of improved accuracy and reduced frequency sensitivity.

Hybrid connectors are utilized in a wide variety of relatively high frequency electrical systems to connect two pairs of circuits to one another so that, ideally, each circuit of a given pair is simultaneously and equally connected to both circuits of the other pair and is isolated from the other circuit of its own pair. For purposes of discussion one pair of circuits can be denominated "input circuits" and the other pair "output circuits," each input circuit equally feeding both output circuits, both output circuits being equally fed by each input circuit, the two input circuits being isolated from one another and the two output circuits being isolated from one another. Thus, if two input circuits (a transmitter and a receiver) are to be connected to a pair of loads (antennas), it is desired that both antennas function together and equally for the receiver and transmitter, but that the transmitter not affect the receiver and vice versa.

The hybrid circuits which have been utilized for this purpose in the past have produced isolation which might be described as non-reciprocal in at least two senses: (a) when one pair of circuits are properly isolated from one another, then the isolation of the other pair of circuits from one another is quite frequency-sensitive, the sensitivity increasing as the frequency increases, and (b) the isolation existing between one pair of ports of the circuit is different from that existing at the other set of ports, so that the pair of circuits between which isolation is essential in a given system can be connected only to said first set of ports, and not to either set of ports.

In accordance with the present invention a hybrid circuit is produced which provides substantially fully reciprocal isolation—the isolation of the circuits of each pair from one another is substantially equal and is virtually independent of the frequency, and it is a matter of indifference which pair of ports are connected to the input circuits and which to the output circuits. Optimum isolation between a first pair of ports is achieved if the circuits connected to the second pair of ports are of equal impedance, and optimum isolation between the circuits connected to the second pair of ports is achieved if the circuits connected to the first pair of ports are of equal impedance. To restate the end result, if a given pair of ports are equally terminated or loaded, the other two ports are isolated from each other and both are connected equally to each of said given ports.

These results are accomplished through the use of a network comprising a pair of input ports and a pair of output ports (the designation "input" and "output" are arbitrarily and interchangeably applied), the ports of each pair being diagonally opposed to one another to define the corners of a four-sided network, the sides of the network comprising electrical connections between the terminals which are so designed as to produce the desired results. These connections include a transmission line extending between each circumferentially adjacent pair of ports, and with at least one, but not necessarily both, of its conductors or wires electrically connected between appropriate terminals of said circumferentially adjacent ports. The two transmission lines extending from a first port are so electrically constructed or modified that at least one wire of each of them is enabled to electrically float relative to a reference potential, while the other two transmission lines, extending from and connected to the port diagonally opposite from said first port, are not thus constructed or modified. Because of the electrical floating permitted to conductors of the first pair of transmission lines, and because of the manner of connection of the wires of all of the transmission lines, paths of equal electrical length are defined between each input port and the two output ports, and parallel electrical paths are defined from one input port to the other such that the signals going from one input terminal to the other along each path cancel one another out over an exceptionally wide frequency range, thereby producing isolation.

The means for causing the first mentioned pair of transmission lines to electrically float may conveniently comprise a pair of tubes of highly magnetically permeable material such as ferrite, through each of which a given one of said pair of transmission lines extends. These ferrite tubes function quite effectively at high frequencies, such as those above 100 megacycles per second, but at frequencies lower than that value the ferrite tubes perform less effectively, with increased loss of efficiency as the frequency decreases. As a result, at lower frequencies the isolation produced by the hybrid network as thus far described tends to deteriorate. To compensate for these undesirable low frequency effects, additional electrical connections are provided between the second input port (the "floating" lines both being connected to the first input port) and the two output ports, those additional connections each having an inductance substantially the same as the inductance of those wires of the "floating" transmission lines to which said additional connections are respectively electrically connected. These additional connections neutralize the low frequency shunting effect of one or the other of the transmission lines which pass through the ferrite tubes.

Through the use of the network of the present invention, simultaneous isolation between the input terminals and between the output terminals can be accomplished with a very high degree of efficiency over an extremely wide range of frequencies, such as from 10 megacycles per second to greater than 1000 megacycles per second.

To the accomplishment of the above, and to such other objects as may hereinafter appear, the present invention relates to the construction and arrangement of a hybrid connector as defined in the appended claims and as described in this specification, taken together with the accompanying drawings, in which:

Figures 1, 2, 3, 4:
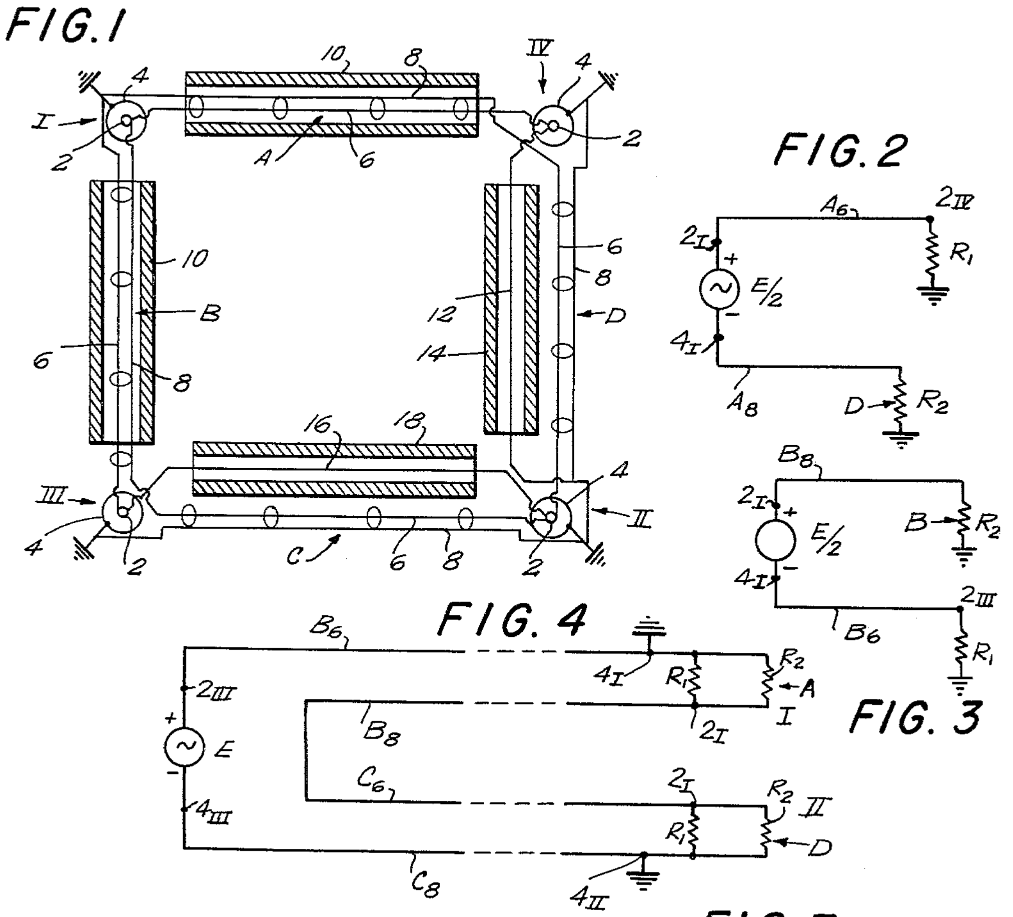
FIG. 1 is a schematic circuit diagram of a typical embodiment of the present invention.
FIGS. 2 and 3 are explanatory circuit diagrams illustrating the manner in which isolation is achieved when one pair of opposed ports are equally terminated.
Figure 5:
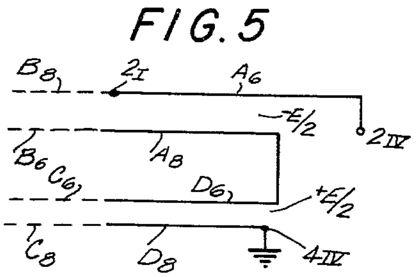
Figure 7:
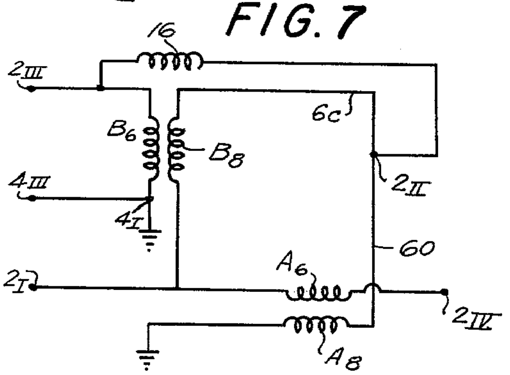
Figure 6:
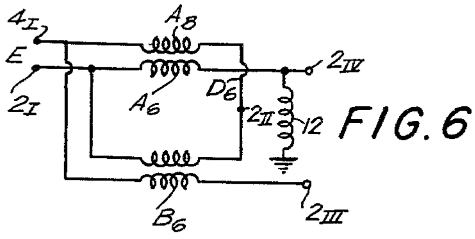

FIGS. 4 and 5 are explanatory circuit diagrams similar to FIGS. 2 and 3 but illustrating the situation when the other pair of diametrically opposed ports are equally terminated; and FIGS. 6 and 7 are illustrative circuit diagrams illustrating the manner in which the additional low-frequency-compensation circuits function.

Turning first to FIG. 1, there is there schematically disclosed a circuit comprising a pair of "input" ports I and II in a pair of "output ports III and IV, the input ports I and II being diametrically opposed to one another and the output ports III and IV being diametrically opposed to one another. First, second, third and fourth transmission lines, generally designated A, B, C and D respectively extend between the aforesaid ports, line A extending between ports I and IV, line B extending between ports I and III, line C extending between ports II and III and line D extending between ports II and IV. Each port is provided with a pair of terminals designated 2 and 4 respectively. Each transmission line comprises what may be electrically considered as, and are schematically illustrated as, inner conductors 6 and outer conductors 8. The outer terminals 4 of each of the ports are, as indicated, connected to a reference potential such as ground. The inner conductor $A_6$ (conductors will hereafter be designated by the letter representing the transmission line of which they form a part, and by the sub-number 6 or 8 depending upon whether they are electrically inner or outer conductors) is connected between the inner terminals $2_I$ and $2_{IV}$ of the ports I and IV respectively (terminals will be thus designated in a manner analogous to conductors). The conductor $B_6$ is connected between the outer terminal $4_I$ and the inner terminal $2_{III}$. The conductors $C_8$ and $D_8$ are connected respectively between the outer terminals $4_{II}$ and $4_{III}$, and $4_{II}$ and $4_{IV}$ respectively. The conductor $C_6$ is connected at one end to the the inner terminal $2_{II}$, and at its other end to conductor $B_8$, the other end of conductor $B_8$ being connected to inner terminal $2_I$. The conductor $D_6$ is connected at one end to inner terminal $2_{II}$ and at its other end to the conductor $A_8$, the other end of which is connected to outer terminal $4_I$. Conductors forming parts of the lines A and B are designed to float electrically relative to a reference potential such as ground, and to that end those lines pass through tubes 10 formed of highly magnetically permeable material of high electrical efficiency, such as ferrite. Ideally, the electrical length of lines B and D are the same, the electrical length of lines A and C are the same, the electrical impedances of lines A and B are the same, and the electrical impedances of lines C and D are the same. The more closely the above electrical length and impedance relationships exist, the better will be the reciprocal isolation produced by the instant network, and the greater will be the frequency range over which that effective isolation exists. The relationships as to electrical length is significant particularly with regard to the frequency sensitivity of the network. The impedance relationship is desirable primarily in order to minimize the effect of reflections in the event that the lines are not terminated in their characteristic impedances.

To analyze the effect of the network thus disclosed, let us assume that the output ports III and IV are equally loaded by output circuits having impedances $R_1$, and that a voltage E is applied as an input across the terminals of input port I. FIGS. 2 and 3 illustrate the circuitry involved. FIG. 2 represents the path from port I to port IV, while FIG. 3 represents the path from port I to port III, Circuit analysis will reveal that a voltage equal to $$-E/2[R_2/(R_1+R_2)]$$

is incident upon line D at port IV, and that an equal and opposite voltage is incident upon line C at port III. Lines C and D connect to port II, the other input port. Hence equal and opposite voltages are applied at port II which cancel one another and thus produce isolation between port I and port II. By reciprocity, it follows that if a voltage E is applied across the terminals 2 and 4 of port II, the other input port I is isolated therefrom. Moreover provided that the path length from port I to port II is the same through lines A and D as through lines B and C, this isolation will be insensitive to frequency. Provided that the outside conductors $A_8$ and $B_8$ are permitted or enabled to float relative to ground, this path length relationship which produces frequency insensitivity is achieved over a wide range of frequencies.

But what if input signals are applied to ports III and IV, and isolation is desired between them? Let us assume that ports I and II are equally loaded by impedances $R_1$, and that a voltage E is fed across the terminals 2 and 4 of port III. FIGS. 4 and 5 illustrate the circuitry involved, the left-hand side of FIG. 4 illustrating the connections to the voltage source at port III, the right-hand side of FIG. 4 illustrating the effect of that source at the output ports I and II respectively, and FIG. 5 illustrating the effect at the opposed input port IV. (For clarity of illustration, conductors $B_6$ and $B_8$ of FIG. 5 have been transposed from the showing of corresponding connections at the left-hand side of FIG. 4, so that in FIG. 5 $B_8$ is uppermost rather than $B_6$.) The voltage E is applied across conductors $B_6$ and $C_8$, conductors $B_8$ and $C_6$ being connected to one another. Conductor $B_6$ is connected to ground at terminal $4_I$, the impedance $R_1$ is connected across $2_I$ and $4_I$, and transmission line C having an impedance $R_2$ is also connected across the terminals 2 and 4 of port I. Similarly the conductor $C_8$ is connected to ground at terminal $4_{II}$, impedance $R_1$ is connected across terminals $4_{II}$ and $2_{II}$, and transmission line D, having an impedance $R_2$, is also connected across the terminals 2 and 4 from port II. From this it will be seen that, as desired, the input voltage at port III energizes the loads $R_1$ at the ports I and III similarly.

As shown in FIG. 5, the conductor $B_6$ is connected to $A_8$, that conductor in turn being connected to conductor $D_6$, which leads to conductor $C_6$. Conductor $B_8$ is connected to terminal $2_I$ and conductor $A_6$ extends from that terminal to terminal $2_{IV}$. Conductor $C_8$ is connected to conductor $D_8$, the latter being connected at its other end to the grounded terminal $4_{IV}$. As a result, as may be seen from FIG. 5, the voltages across conductors $A_6$ and $A_8$ and across conductors $D_6$ and $D_8$ are equal and opposite, thus cancelling one another out at port IV and producing isolation. Once again, it may be shown by reciprocity that the same isolation exists between ports III and IV when a voltage is applied across port IV. Again, when the path lengths between ports III and IV are equal whether going through ports I or II, this isolation effect will be essentially frequency insensitive.

The ferrite tubes 10 are employed to surround those transmission lines A and B whose outer conductors 8 are not grounded at both ends, thereby permitting those outer conductors 8 to float relative to ground or any other reference potential.

As a result of the circuitry here disclosed, and the connections and relationships between the ports thereof, it will be apparent that if any two opposed pairs of ports are equally terminated, each of the other two pairs of ports will be equally connected to them while being isolated from one another. It makes no difference which opposed pair of ports are equally terminated—it can be either ports I and II or ports III and IV. The circuit works equally well in either case.

The effect of the ferrite tubes 10 in permitting the outer conductors 8 of the lines A and B to float electrically is well defined at high frequencies, such as those above 100 megacycles per second, and is exceptionally well defined at even higher frequencies on the order of 1000 megacycles per second. However, as the frequency drops the floating effect produced by the ferrite tubes 10 decreases in effectiveness. This results in a failure or deterioration of isolation. The inner and outer conductors 6 and 8 of lines A and B respectively are closely coupled to one another within the ferrite tubes 10, and that coupling is illustrated, for the situation where a voltage E is applied at port I, in FIG. 6. Disregarding for the moment the inductance 12 shown in FIG. 6, and assuming that ports III and IV are equally terminated in open circuits, it will be seen that when the voltage E is applied across port I current flows through conductors $B_8$ and $A_8$, the voltage E dividing equally between them. The voltage in $B_8$ induces an equal and opposite voltage in $A_6$, those two voltages being applied respectively at terminals $2_{III}$ and $2_{IV}$. Thus a finite voltage appears at terminal $2_{II}$, destroying isolation.

In order to restore isolation for this low frequency inability of the ferrite tubes 10 to perform their desired functions, an additional connector 12 is connected between terminals $2_{IV}$ and $4_{II}$, the latter being at ground potential, the inductance of the connector 12 being equal to the inductance of the inner conductor $A_6$. To that end the conductor 12 is surrounded by a tube 14 of ferrite or the like which is preferably closely the same as the tube 10 which surrounds the line A. This provides an additional conductive path from port I through conductor $A_6$ and connector 12, the applicable voltage dividing equally between the two lines because of their equal inductances. The voltage developed in conductor $A_6$ by this conductive current induces a voltage in conductor $A_8$ which is equal and opposite to that produced by the normal conductive flow therethrough from terminal $2_I$ to terminal $4_I$. The voltages at terminals $2_{IV}$ and $2_{III}$ then become equal and opposite, thus producing isolation between port II and port I.

FIG. 7 illustrates the situation for low frequency isolation between ports III and IV. Disregarding for the moment the connector 16, let us assume that a voltage E is applied across the terminals $2_{III}$ and $4_{III}$, while ports I and II are equally terminated in an open circuit. A conductive path is then established through conductor $B_6$. A voltage E is induced in conductor $B_8$, thus applying a voltage $-E/2$ at terminal $2_I$ and a voltage $+E/2$ at terminal $2_{II}$, and causing a voltage of $-E/2$ to be applied at terminal $2_{IV}$. In order to eliminate this voltage at terminal $2_{IV}$, an additional connector 16 is connected between the inner terminals 2 of ports II and III, the inductance of the connection 2 being closely the same as the inductance of the inner conductor $B_6$, the conductor 16 being surrounded by a tube 18 of high magnetic permeability such as ferrite which is closely the same as the tube 10 which surrounds the transmission line B. As a result, as may be seen from FIG. 7, a second conductive path is established from terminal $2_{III}$ to ground via conductor $A_8$. The voltage produced by the conductive current through conductor $A_8$ induces an equal and opposite voltage in conductor $A_6$ which cancels out the voltage applied to it by reason of the induction of voltage in conductor $B_8$. Hence terminal $2_{IV}$ is maintained at a zero potential, and isolation is achieved.

While the additional connectors 12 and 16 are particularly needed at low frequencies on the order of 100 megacycles or less, because it is in that range that the ferrite tubes 10 surrounding the transmission lines A and B are particularly inadequate, it has been found that the inclusion of the additional connectors 12 and 16 even at higher frequencies is desirable. At such higher frequencies the hybrid network without the connectors 12 and 16 works satisfactorily, but an even higher degree of isolation is achieved when the connectors 12 and 16 are operative.

As a result of the circuit arrangement of the present invention a hybrid circuit is produced which provides for isolation substantially independent of frequency over a very wide range of frequencies. That isolation is fully reciprocal as between each opposed pair of ports, it being a matter of indifference whether a given pair of opposed ports is utilized for input or for output purposes.

While only a single embodiment of the present invention has been here specifically disclosed, it will be apparent that many variations have been made therein, all within the scope of the instant invention as defined in the following claims.

I claim:

1. A hybrid connector comprising a four-sided network having first, second, third, and fourth ports, said first and second ports and said third and fourth ports respectively being arranged in diagonally opposed pairs, each port having first and second terminals, and first, second, third and fourth transmission lines connected between said ports sequentially, said transmission lines comprising the sides of said network, said first and second transmission lines connected at one end respectively to said first port and extending respectively toward said fourth and third ports, means active on said first and second transmission lines for permitting them to float relative to a reference potential, said third and fourth transmission lines being connected at one end to said second port and extending respectively toward said third and fourth ports, said first and fourth transmission lines having substantially the same electrical length and said second and third transmission lines having substantially the same electrical length, said first and second transmission lines being connected to said third and fourth transmission lines respectively in phase reversing relationship.

2. The connector of claim 1, in which said means for permitting floating comprises high permeability magnetic tubes surrounding said first and second transmission lines.

3. In the connector of claim 2, additional electrical connections between said first and second terminals of said second port and said second terminals of said third and fourth ports respectively, the inductance of said additional connections being substantially the same as that of the conductors of said first and second transmission lines to which they are connected respectively.

4. In the connector of claim 2, additional electrical connections between said first and second terminals of said second port and said second terminals of said third and fourth ports respectively, the inductance of said additional connections being substantially the same as that of the conductors of said first and second transmission lines to which they are connected respectively, and high permeability magnetic tubes surrounding said additional electrical connections respectively.

5. In the connector of claim 1, additional electrical connections between said first and second terminals of said second port and said second terminals of said third and fourth ports respectively, the inductance of said additional connections being substantially the same as that of the conductors of said first and second transmission lines to which they are connected respectively.

6. In the connector of claim 1, additional electrical connections between said first and second terminals of said second port and said second terminals of said third and fourth ports respectively, the inductance of said additional connections being substantially the same as that of the conductors of said first and second transmission lines to which they are respectively connected.

7. A hybrid connecter comprising a four-sided network having first, second, third, and fourth ports, said first and second ports and said third and fourth ports respectively being arranged in diagonally opposed pairs, each port having first and second terminals, said first, second, third and fourth transmission lines connected between said ports sequentially, said transmission lines comprising the sides of said network, said first and second transmission line connected at one end to said first port and extending respectively toward said fourth and third ports respectively, means active on said first and second transmission lines for permitting them to float relative to a reference potential, said third and fourth transmission lines being connected at one end to said second port and extending respectively toward said third and fourth ports respectively, means connecting said first terminal of said first port to the electrically outer and inner wires respectively of said first and second transmission lines, means connecting said first and second terminals of said second port one to the electrically inner wires and the other to the electrically outer wires of said third and fourth transmission lines, and means electrically connecting the electrically outer and inner wires of said first and second transmission lines respectively to said electrically inner and outer wires of said third and fourth transmission lines respectively, said first and fourth transmission lines having substantially the same electrical length and said second and third transmission lines having substantially the same electrical length.

8. The connector of claim 7, in which said means for permitting floating comprises high permeability magnetic tubes surrounding said first and second transmission lines.

9. In the connector of claim 8, additional electrical connections between said first and second terminals of said second port and said second terminals of said third and fourth ports respectively, the inductance of said additional connections being substantially the same as that of said inner wires of said first and second transmission lines respectively.

10. In the connector of claim 8, addition electrical connections between said first and second terminals of said second port and said second terminals of said third and fourth ports respectively, the inductance of said additional connections being substantially the same as that of said inner wires of said first and second transmission lines respectively, and high permeability magnetic tubes surrounding said additional electrical connections respectively.

11. In the connector of claim 7, additional electrical connections between said first and second terminals of said second port and said second terminals of said third and fourth ports respectively, the inductance of said additional connections being substantially the same as that of said inner wires of said first and second transmission lines respectively.

12. In the connector of claim 7, additional electrical connections between said first and second terminals of said second port and said second terminals of said third and fourth ports respectively, the inductance of said additional connections being substantially the same as that of said inner wires of said first and second transmission lines respectively, and high permeability magnetic tubes surrounding said additional electrical connections respectively.

13. A hybrid connector comprising first and second input ports and first and second output ports, each port comprising first and second terminals, first and second A- and B-wire transmission lines electrically connected to said first input port with the A-wire of one line and the B-wire of the other line connected to said first terminal thereof and the B-wire of said one line and the A-wire of said other line connected to said second terminal thereof, means active on said first and second transmission lines for permitting said A-wires in said lines to float electrically relative to a reference potential, third and fourth A- and B-wire transmission lines electrically connected to said second input terminal with the A-wires of both lines connected to the second terminal thereof, electrical connections between said second terminals of said first and second output ports and said B-wires of said first and second transmission lines respectively, electrical connections between said first terminals of said first and second output ports and said A-wires on said third and fourth transmission lines respectively, and electrical connections between said A-wires of said first and second transmission lines and said B-wires of said third and fourth transmission lines respectively, said first and fourth transmission lines having substantially the same electrical length, said second and third transmission lines having substantially the same electrical length, said first and second transmission lines having substantially the same impedance, and said third and fourth transmission lines having substantially the same impedance.

14. The connector of claim 13, in which said means for permitting floating comprises high permeability magnetic tubes surrounding said first and second transmission lines respectively.

15. In the connector of claim 14, additional electrical connections between said second terminals of said output ports and said first and second terminals respectively of said second input port, the inductance of said additional connections being substantially the same as that of said B lines of said first and second transmission lines respectively.

16. In the connector of claim 14, additional electrical connections between said second terminals of said output ports and said first and second terminals respectively of said second input port, the inductance of said additional connections being substantially the same as that of said B lines of said first and second transmission line respectively, and high permeability magnetic tubes surrounding said additional electrical connections respectively.

17. In the connector of claim 13, additional electrical connections between said second terminals of said output ports and said first and second terminals respectively of said second input port, the inductance of said additional connections being substantially the same as that of said B lines of said first and second transmission lines respectively.

18. In the connector of claim 13, additional electrical connections between said second terminals of said output ports and said first and second terminals respectively of said second input port, the inductance of said additional connections being substantially the same as that of said B lines of said first and second transmission lines respectively, and high permeability magnetic tubes surrounding said additional electrical connections respectively.

19. A hybrid connector comprising first, second, third and fourth ports each having first and second terminals, first and second transmission lines connected between said first port and said fourth and third ports respectively and having electrically inner and outer wires, said inner wires of said first and second lines being connected at one end to said first and second terminals of said first port respectively and at their other ends to said second terminals of said fourth and third ports respectively, said outer wires of said first and second lines being connected at one end to said second and first terminals of said first port respectively and at their other ends to said second terminal of said second port, electrical connections between said first terminal of said second port and said first terminal of said third and fourth ports respectively, and additional electrical connections between said second terminals of said third and fourth ports and said first and second terminals of said second port respectively, said additional electrical connections having inductances substantially the same as that of the inner wires of said first and second lines respectively.

20. The connector of claim 19 in which high permeability magnetic tubes surround said additional electrical connections.

References Cited by the Examiner

UNITED STATES PATENTS

| | | | |
|---|---|---|---|
| 2,735,986 | 2/1956 | Hybles et al. | 333—11 |
| 2,736,864 | 2/1956 | Sinclair et al. | 333—11 |
| 2,865,006 | 12/1958 | Sabaroff | 333—26 |
| 3,025,480 | 3/1962 | Guanella | 333—26 |

HERMAN KARL SAALBACH, *Primary Examiner.*